July 13, 1971    J. H. FRIEDAY ET AL    3,592,610
CHEMICAL RECOVERY FURNACE WITH AIR CASCADE EVAPORATOR SYSTEM
Original Filed Dec. 27, 1967    3 Sheets-Sheet 1
FIG_1
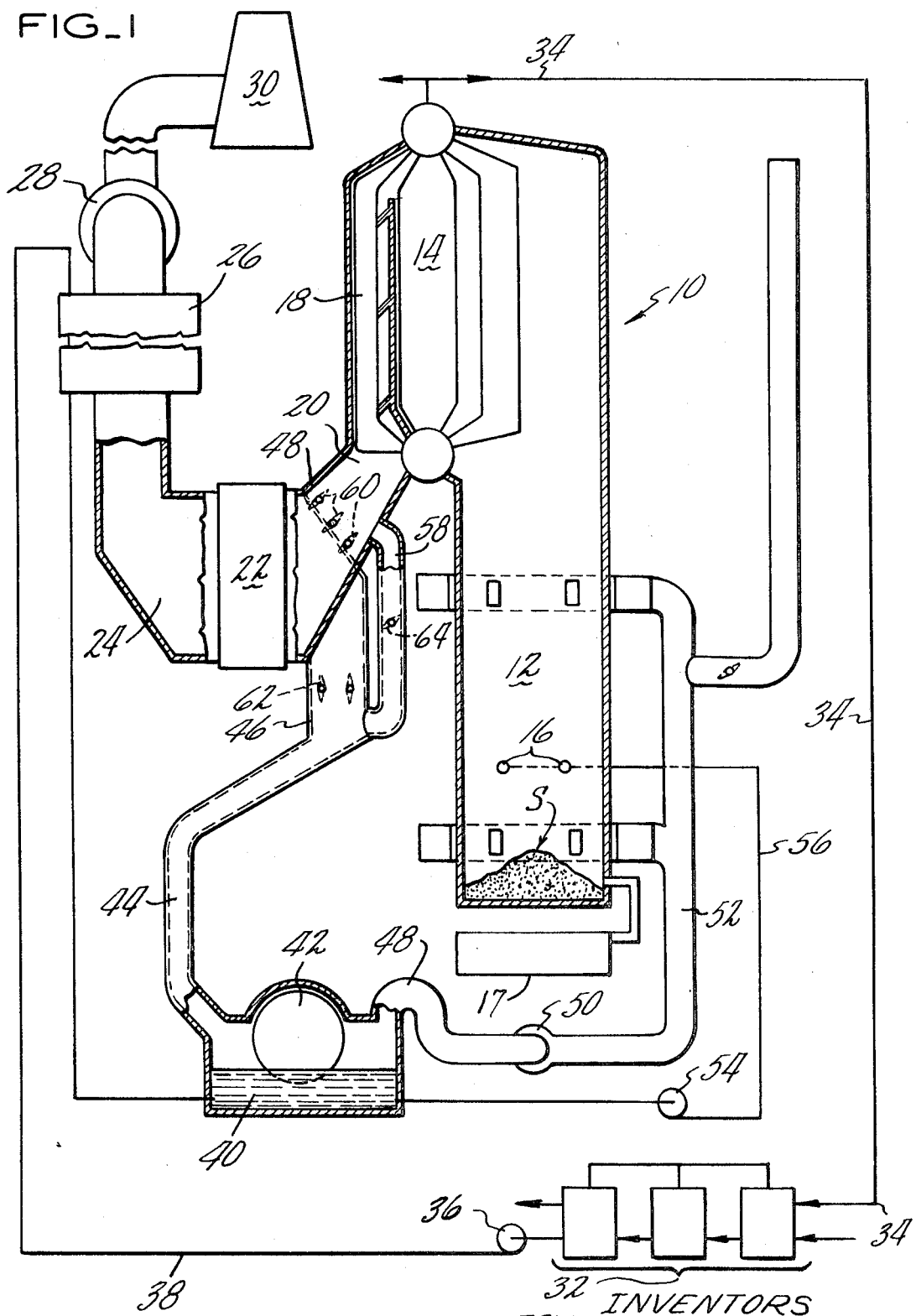
INVENTORS
JAY H. FREIDAY
GEORGE J. PROHAZKA
BY Eldon H. Luther
ATTORNEY

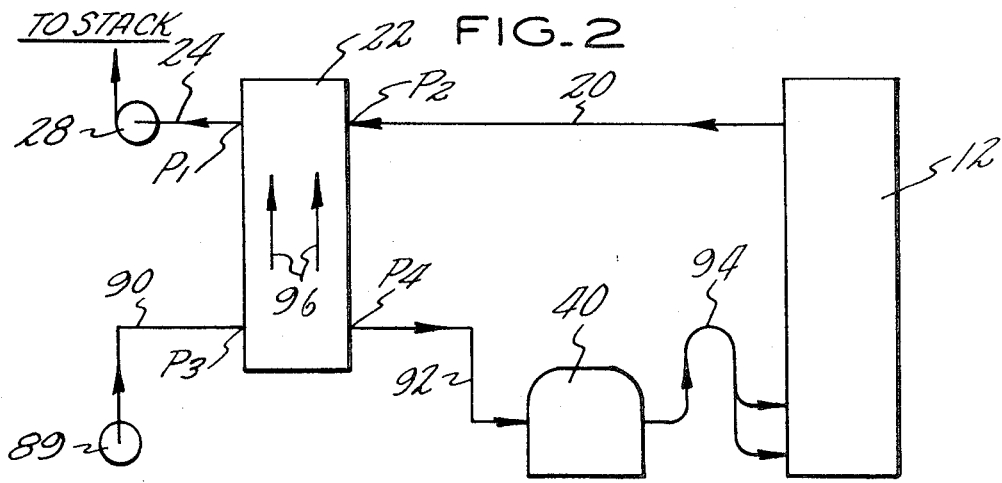
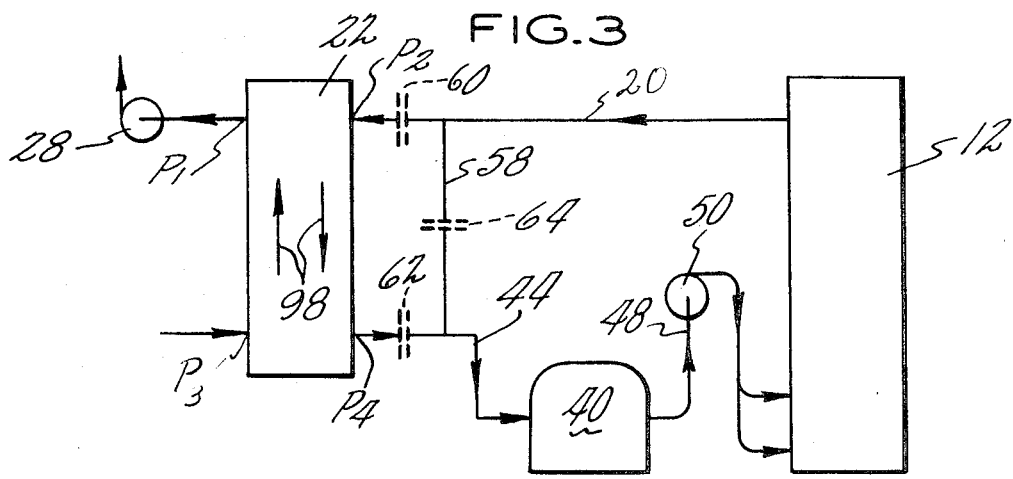
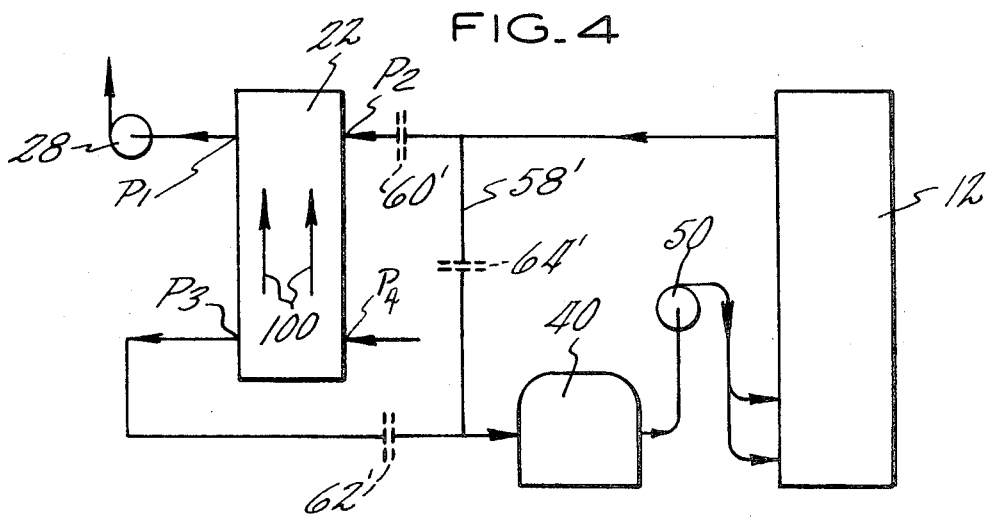

FIG_5
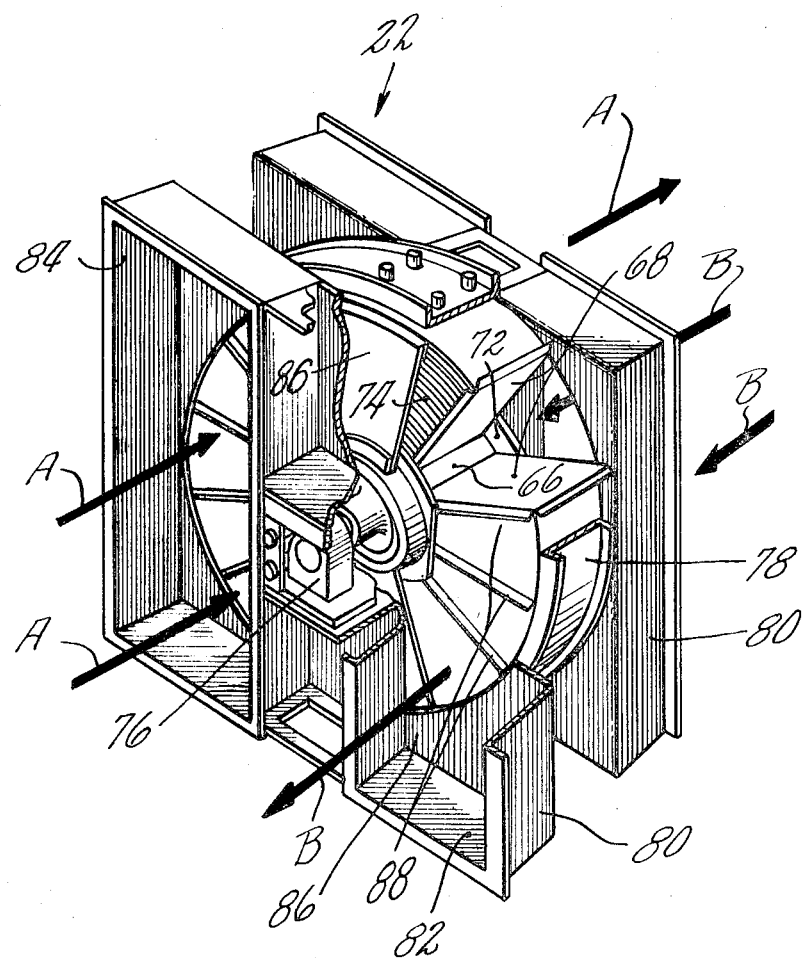

United States Patent Office 3,592,610
Patented July 13, 1971

3,592,610
CHEMICAL RECOVERY FURNACE WITH AIR CASCADE EVAPORATOR SYSTEM
Jay H. Freiday, West Hartford, and George J. Prohazka, Simsbury, Conn., assignors to Combustion Engineering, Inc., Windsor, Conn.
Continuation of application Ser. No. 693,891, Dec. 27, 1967. This application Dec. 17, 1969, Ser. No. 882,762
Int. Cl. B01j 1/00; F28d 19/04
U.S. Cl. 23—262
6 Claims

ABSTRACT OF THE DISCLOSURE

In a chemical recovery furnace system including a rotary regenerative air heater and an air cascade evaporator, the incoming combustion air supply therefor having been heated in the air heater by the recovery furnace exhaust gases, the placing of the FD (forced draft) fan between the cascade evaporator and the recovery furnace for the purpose of reducing the air-to-gas leakage across the moving seals of the air heater. Also, there is provided a bypass means between the exhaust outlet from the furnace and the inlet side of the air cascade evaporator to, under certain conditions, selectively form a closed recirculating heat transfer loop so that a portion of the exhaust gases may be recirculated through the air cascade evaporator and back into the furnace to cool the hot molten furnace smelt in order to reduce the possibility of a smelt-water reaction explosion.

---

This application is a continuation of application Ser. No. 693,891, filed Dec. 27, 1967, and now abandoned.

BACKGROUND AND SUMMARY OF THE INVENTION

This invention relates to chemical recovery furnace systems and more particularly to an improvement in a chemical recovery furnace system including a rotary regenerative air heater and an air cascade evaporator.

Chemical recovery systems are used generally in the paper making industry to process and recover the chemicals used in digesting wood or other cellulose material. Pulp for the manufacture of paper is produced by treating the cellulose material with certain chemical solutions to digest this material. The cellulose fibers are separated from the formed liquor to be further processed to produce the pulp. The liquor meanwhile is processed in a chemical recovery system to recover the valuable chemicals therein while utilizing the heating value thereof.

In the chemical recovery system described herein, the liquor is concentrated in a cascade evaporator by direct contact with heated combustion supporting air and then introduced into a furnace where it is burned in a self-sustaining manner with the chemicals being smelted and collected at the bottom of the furnace for removal and recovery. The combustion exhaust gases are drawn through an air heater to heat the incoming air used to support combustion. In the past, due to inherent fouling difficulties in rotary regenerative air heaters, it was necessary to use tubular air heaters to preheat the incoming combustion air. Tubular air heaters, however, also presented some problems in that they were subject to low temperature corrosion and gas side blockage. Due to recent improvements in rotary regenerative air heaters, it is now possible to use this type of air heater in a chemical recovery system. The improvement in the rotary regenerative air heater, however, form no part of this invention and are therefore not described herein.

Rotary regenerative air heaters can be more easily designed to operate at relatively low exhaust gas temperatures. However, the problem of air-to-gas leakage across moving seals, still remains. Air-to-gas leakage refers to the leakage across the moving seals between the outgoing hot exhaust gases and incoming combustion supporting air and is due primarily to differential pressures therebetween. Our invention proposes to change the location of the FD (forced draft) fan from the upstream air inlet side of the air heater to the outlet side of the air stream through the air heater. By so relocating the FD fan, the absolute pressure through the air side of the system is reduced. The reduction of the air side pressure results in a reduction of the differential pressure between the air and gas sides of the rotary regenerative air heater and a corresponding reduction in the leakage.

The relocation of the FD fan has a secondary benefit. It enables a closed recirculating heat transfer loop to be formed between the recovery furnace and the cascade evaporator through the FD fan. By the inclusion of suitable additional dampers and a duct connecting the furnace exhaust gas outlet and cascade evaporator inlet, the air supply may be cut off and exhaust gases rerouted so that a closed exhaust gas recirculating loop can be formed between the furnace and cascade evaporator through the FD fan. The recirculating exhaust gases are deficient in oxygen and cannot support combustion of the fuel in the furnace. Their only function, therefore, is to serve as a medium for cooling the hot molten furnace smelt by transferring heat therefrom to the liquor in the cascade evaporator. This feature has great value in effecting a safe emergency shutdown when water is believed to be entering the furnace, since as is well known, water contacting the hot molten furnace smelt has a tendency to create a catastrophic explosion under certain conditions.

BRIEF DESCRIPTION OF THE DRAWINGS

FIG. 1 is a diagrammatic representation of a chemical recovery system incorporating our invention;

FIGS. 2, 3 and 4 are diagrammatic representations of chemical recovery systems particularly showing the direction of leakage in the air heater under different FD fan location arrangements; and FIG. 5 is a perspective view, partly broken away, of a rotary regenerative air heater.

DESCRIPTION OF PREFERRED EMBODIMENTS

Referring now to the drawings, the illustrative embodiment of the invention shown in FIG. 1 includes a chemical recovery system 10 having a furnace 12 extending upwardly with a boiler 14 at its upper end. This system is similar to that shown by Smith in Pat. No. 3,047,362, assigned to the same assignee as is the invention herein set forth. Description herein of the Smith system is only of such detail as necessary for a full understanding of our improvements thereover.

Concentrated liquor is introduced into the furnace through spray nozzles 16 and is dried almost instantaneously as it passes down toward the bottom of the furnace. The combustibles of the liquor are burned during this discent and upon a pile at the furnace bottom. The chemicals in the liquor are smelted in the furnace and collected at the bottom thereof with the smelt S being continuously withdrawn through a suitable spout into a dissolving tank 17 to be recovered for reuse as is well known in the art. The combustion gases generated by burning the liquor in furnace 12 pass upwardly over the tubes of boiler 14 and down through passageway 18 leaving the boiler at the outlet or exit 20. The exhaust gases pass through air heater 22, of the rotary regenerative type, through duct 24 to a precipitator 26, and finally through an ID (induced draft) fan 28 to stack 30 for discharge to the atmosphere. By means of air heater 22, further described hereinbelow, the heat in the exhaust gases from the furnace 12 is used to increase the temperature of the air used to support combustion.

Liquor from a pulp digester (not shown) is increased in concentration by passing through multiple effect evaporators 32, of conventional construction and operation, which receive steam from boiler 14 through conduit 34. The concentrated liquor is conveyed by pump 36 through conduit 38 to the tubular air cascade evaporator 40 having one or more evaporator wheels 42 and being of well-known construction. The liquor in the air cascade evaporator 40 is further concentrated by passing heated air from air heater 22 through duct 44 and over rotating evaporator wheels 42 thereof. FD fan 50 located between the air cascade evaporator 40 and the furnace 12, draws air through duct 52 and forces it into the furnace 12 in order to provide air support for combustion of the concentrated liquor; the concentrated liquor being pumped by pump 54 through conduit 56 and sprayed into the furnace 12, as noted, by nozzles 16.

The rotary regenerative air heater 22 is shown in detail in FIG. 5 so as to enable one to better understand where the problem to which this improvement is directed occurs. A central rotor post 66, having radial partitions 68 that extend outward therefrom to a cylindrical rotor shell, forms a series of sectorial compartments 72 adapted to contain therein a quantity of heat absorbent material 74 (shown in only one compartment for simplicity). Rotor support bearings 76 support central rotor post 66 in the housing of the air heater 22. The rotor 66 is surrounded by an essentially cylindrical rotor housing 78 that includes rectangular transition means 80 at opposite ends thereof which are suitably apertured on spaced sides 82, 84 of the air heater 22 to permit heating fluid A and a fluid to be heated B to flow between their respective inlet and outlet ducts and through the heat absorbent material carried by the rotor. To prevent the intermingling of the fluids as they pass through the heat exchanger, sector plates 86 are provided at the ends of the rotor between sides 82, 84 of the transition means 80 and arranged to lie in sealing relationship with the sealing means 88 at the end edges of radial partitions 68 as the partitions 68 pass from one side of the air heater to the other. It is difficult to provide seals that remain tight during operation because, for example, air heaters of this type are susceptible to warpage of the rotor. When the seals fail to remain tight, the differential pressure between the gas from the furnace and the incoming air for combustion causes a forced leakage between the sealing means 86 and the sector plates 84 from the high pressure side to the low pressure side.

FIGS. 2, 3 and 4 show various arrangements of the elements of chemical recovery systems with particular emphasis on the pressure differential and resultant leakage existing across the moving seals in the air heater. Table I shows the pressure, in inches of water, at the inlet and outlet sides of the gas flow and air flow through the rotary regenerative air heater of each of the system arrangements.

TABLE I

[Typical gage pressures at the four connections of a regenerative air heater (inches $H_2O$)]

| Figure | 2 | 3 | 4 |
|---|---|---|---|
| Pressure point: | | | |
| $P_1$ | −5.12 | −5.12 | −5.12 |
| $P_2$ | −.85 | −.85 | −.85 |
| $P_3$ | 11.2 | 0 | −2.1 |
| $P_4$ | 9.04 | −2.1 | 0 |
| $\Delta P_1 P_3$ | 16.32 | 5.12 | 3.02 |
| $\Delta P_2 P_4$ | 9.9 | 1.25 | .85 |

The arrangement of FIG. 2 represents a system according to that set forth in the aforementioned patent to Smith with the inclusion of a rotary regenerative air heater 22. FD fan 89 forces air into duct 90, through air heater 22 and by duct 92 into air cascade evaporator 40 and thence to furnace 12 through duct 94. ID fan 28 draws gas from the furnace through duct 20, air heater 22 and duct 24 to stack 30. The ID fan creates a negative pressure across the gas side of the air heater 22 while the FD fan creates a positive pressure across the gas side of the air heater while the FD fan creates a positive pressure across the air side thereof. As noted in Table I, the differential pressure between the gas exit $P_1$ and air entrance $P_3$ ($\Delta P_1 P_3$) is 16.32″ $H_2O$ while that between the air exit $P_4$ and gas entrance $P_2$ ($\Delta P_2 P_4$) is 9.9″ $H_2O$. The direction of this relatively large pressure differential is shown by arrows 96 on FIG. 2.

By our invention we propose to locate FD fan 50 between the air cascade evaporator 40 and furnace 12, as noted above, and shown schematically in FIG. 3. By this orientation, the FD fan creates a negative pressure across the air side of the air heater 22 as shown in the above Table I. By this arrangement, the differential pressure between the gas exit $P_1$ and air entrance $P_3$ ($\Delta P_1 P_3$) and the differential pressure between the air exit $P_4$ and gas entrance $P_2$ ($\Delta P_2 P_4$) is greatly reduced over that existing in the arrangement shown in FIG. 2. The direction of the pressure differential is shown by arrows 98. As noted above, the amount of air-to-gas leakage across the moving seals of the rotory regenerative air heater is dependent directly upon the differential pressures existing between the respective air and gas sides. Thus, by reducing this differential pressure, leakage will be correspondingly reduced. Leakage reduction results in a lessening of the volume of gas per unit time at a given velocity which must pass through the precipitator 26, ID fan 28, interconnecting gas ducts 24 and stack 30. Therefore, a chemical recovery system incorporating our invention, for a given optimum gas flow velocity, will show a reduction in the size of the precipitator, the ID fan, the gas ducts and the exhaust stack, with a corresponding reduction in material and cost. The ID fan driving motor and power requirements will also be reduced.

The arrangement of FIG. 4 shows a modification of the system proposed in FIG. 3. The FD fan 50 is again located between the air cascade evaporator 40 and furnace 12. However, instead of using a counterflow rotary regenerative air heater, a parallel flow air heater is used. As seen in Table I, the differential pressure between the air inlet and gas inlet ($\Delta P_2 P_4$) and the differential pressure between the air exit and gas exit ($\Delta P_1 P_3$) is reduced even below that of the arrangement of FIG. 3, the direction thereof being shown by arrows 100. This arrangement, however, does have the inherent disadvantage that heat transfer in a parallel flow heat exchanger is markedly less than heat transfer in a counterflow heat exchanger. It is considered that the benefit of reduced leakage will offset the disadvantage of reduced heat transfer in this arrangement.

The particular arrangement of our invention, as best seen in FIGS. 1 and 3, shows a particular aptitude for a secondary modification of the chemical recovery system of Smith. As is well known, the reaction of water, as from a water tube leakage or failure, with furnace smelt under certain conditions may cause a catastrophic physical explosion. It has been found that explosions occur most often when the furnace smelt is at a temperature range of from 1425° F. to 1725° F. Therefore, upon detection of water leakage into the furnace, a means of preventing an explosion might be to cool the smelt to below 1425° F. We have determined that cooling and recirculating the furnace exhaust gases will accomplish a smelt temperature reduction sufficient to markedly reduce the probability of an explosion occurring.

A bypass duct 58 is located so as to connect exit 20 with duct 44. Located in exit 20 as at portion 48 downstream of the inner section of duct 58 with exit 20 is damper 60. In duct 44 as at portion 46 upstream of the inner section of duct 58 with duct 44 is damper 62. Dampers 60 and 62 are maintained either fully opened for normal operating conditions or fully closed when recirculation of the furnace exhaust gases is desired. In duct 58 there is a damper 64 which may be adjusted, in conjunction with dampers 60 and 62, so as to enable a closed recirculating heat transfer loop to be formed. That is to say, by locating the FD fan 50 as shown and by closing dampers 60 and 62 and opening damper 64, we are able to form a closed exhaust gas recirculating loop including duct 20, duct 58, duct 44, air cascade evaporator 40, duct 48, FD fan 50, duct 52 and furnace 12 when it is determined that conditions exist under which a water-smelt explosive reaction may occur. The exhaust gases are deficient in oxygen and will not support furnace combustion. The recirculation of the furnace exhaust gases through the closed loop will, therefore, serve to reduce the temperature of the smelt S in the furnace by heat transfer from the smelt to the liquor in the cascade evaporator through the medium of the recirculating gases, thus reducing the chance of an explosion. The arrangement of FIG. 4 is also suitable to formation of a similar closed recirculating heat transfer loop by the addition of bypass duct 58' and dampers 60', 62', and 64' and operation thereo in a manner similar to that of FIGS. 1 and 3.

Thus it can be seen that by the arrangements of our chemical recovery system elements, we have accomplished a two-fold advantage over chemical recovery systems used in the past. By relocating the FD fan between the air cascade evaporator and the furnace, there is a reduction in differential pressure between the air and gas sides of the rotary regenerative air heater. Such a reduction in differential pressure correspondingly reduces air-to-gas leakage across the moving air heater seals, a problem heretofore of particular significance in rotary regenerative air heaters. Such leakage reduction yields a smaller volume of exhaust gases per unit of time at a specific velocity which must be handled. This reduction in volume leads to a reduction in size of the precipitator, the ID fan, the gas ducts and the exhaust stack, while also reducing the power requirements for the ID fan.

Secondly, by the inclusion of a duct between the furnace gas exit and the entrance to the air cascade evaporator and the placement of suitable dampers therein, we are able to form a closed recirculating heat transfer loop for the furnace gases for the purpose of cooling the furnace smelt and thus reducing the possibility of catastrophic water-smelt reaction explosions.

While we have illustrated and described several preferred embodiments of our invention, it is to be understood that such are merely illustrative and not restrictive and that variations and modifications may be made therein without departing from the spirit and scope of the invention. We therefore do not wish to be limited to the precise details set forth but desire to avail ourselves of such changes as fall within the purview of our invention.

We claim:

1. In a chemical recovery furnace system: a chemical recovery furnace, a rotary regenerative air heater having an air passage and a gas passage with sealing means therebetween, a cascade evaporator, incoming combustion air passing through said rotary regenerative air heater air passage to said cascade evaporator, exhaust gases from said recovery furnace passing through said air heater gas passage to heat said incoming combustion air, and a forced draft fan means for causing air circulation in said system into said furnace, said forced draft fan means being located in said air flow downstream of said rotary regenerative air heater between said cascade evaporator and said furnace whereby a reduction in differential pressure across said sealing means thereof is effected so that air-to-gas leakage will be reduced.

2. In a chemical recovery furnace system: a chemical recovery furnace, said furnace having an exhaust gas outlet means, a cascade evaporator, said cascade evaporator having an inlet means and an outlet means, said outlet means connected to said recovery furnace, means for recirculating a portion of said exhaust gases from said exhaust gas outlet means through said cascade evaporator inlet means and returning said portion of exhaust gases to said furnace to cool the furnace smelt, said recirculating means comprising a bypass means connecting said exhaust gas outlet means and said cascade evaporator inlet means, means downstream of said bypass means in said exhaust gas outlet means to selectively block said outlet means, means upstream of said bypass means in said cascade evaporator means to selectively block said inlet means, actuating means for simultaneously moving said exhaust gas outlet blocking means and said cascade evaporator blocking means to their respective blocking positions whereby a substantially closed loop between said furnace, said bypass means and said cacade evaporator will be established, and a forced draft fan located between said cascade evaporator and said chemical recovery furnace to cause circulation in said system even when said system is selectively in its closed loop configuration.

3. In a chemical recovery furnace system: a chemical recovery furnace, a rotary regenerative air heater having a first passage for combustion-supporting air and a second passage for furnace gaseous products of combustion, sealing means positioned between said first and second passages of said rotary regenerative air heater to inhibit flow between said passages; an air communication duct between said first air passage and said chemical recovery furnace for transporting incoming combustion air and a gas communication duct between said second gas passage and said chemical recovery furnace for transporting gaseous products of combustion, and a forced draft fan located in said air communication duct between said rotary regenerative air heater and said chemical recovery furnace for circulating incoming combustion air through said rotary regenerative air heater to said chemical recovery furnace, whereby a reduction in differential pressure across said sealing means of said rotary regenerative air heater is effected to reduce the air-to-gas leakage between said first and second passages through said sealing means.

4. Apparatus as claimed in claim 2 wherein said forced-draft fan is located between said cascade evaporator and said furnace.

5. In a chemical recovery system: a chemical recovery furnace, a rotary regenerative air heater having an air passage means and a gas passage means, a cascade evaporator, first conduit means located to establish a flow path from said rotary regenerative air heater air passage means through said cascade evaporator to said chemical recovery furnace, second conduit means located to establish a flow path from said chemical recovery furnace through said rotary regenerative air heater gas passage means to said atmosphere, third conduit means communicating between said first conduit means upstream of said rotary regenerative air heater and said second conduit means between said rotary regenerative air heater and said cascade evaporator, means for selectively establishing an open flow path in said first and second conduits through said air heater or a closed flow path through said third conduit, and a forced draft fan located in said first conduit means between said chemical recovery furnace and the communication of said first conduit means with said third conduit means whereby said forced draft fan will selectively move air through said rotary regenerative air heater air passage means or recirculate furnace gases from said second conduit means through said third and first conduit means back to said chemical recovery furnace depending upon the flow path selected.

6. Apparatus as claimed in claim 5 wherein said forced draft fan is located between said chemical recovery furnace and said cascade evaporator.

References Cited

UNITED STATES PATENTS

| | | | |
|---|---|---|---|
| 2,665,120 | 1/1954 | Blomquist | 165—9X |
| 2,893,829 | 7/1959 | Hutton | 23—48 |
| 3,047,362 | 7/1962 | Smith | 23—48 |

JAMES H. TAYMAN, JR., Primary Examiner

U.S. Cl. X.R.

23—277, 48; 165—8, 9